United States Patent [19]
Sakakibara et al.

[11] Patent Number: 5,515,695
[45] Date of Patent: May 14, 1996

[54] REFRIGERATING APPARATUS

[75] Inventors: Hisayoshi Sakakibara, Nishio; Yasushi Yamanaka, Nakashima; Yoshiaki Takano, Obu, all of Japan

[73] Assignee: Nippondenso Co., Ltd., Kariya, Japan

[21] Appl. No.: 398,131

[22] Filed: Mar. 3, 1995

[51] Int. Cl.$^6$ .......................... G05D 27/00; G05D 23/30
[52] U.S. Cl. ............................. 62/202; 236/92 B
[58] Field of Search ............... 62/202, 225, 212; 236/92 B

[56] References Cited

U.S. PATENT DOCUMENTS

| | | | |
|---|---|---|---|
| 2,191,925 | 2/1940 | Kaufman | 62/202 |
| 2,244,376 | 6/1941 | Spofford | 62/202 |
| 2,297,872 | 10/1942 | Carter et al. | 62/202.1 |
| 2,400,334 | 5/1946 | Berry . | |
| 2,577,902 | 12/1951 | McGrath . | |
| 2,577,903 | 12/1951 | McGrath . | |
| 2,787,130 | 4/1957 | Kaufman . | |
| 4,461,635 | 7/1984 | Rudebeck | 62/202 |
| 4,979,372 | 12/1990 | Tanaka | 62/225 |
| 5,127,237 | 7/1992 | Sendo et al. | 62/225 |

FOREIGN PATENT DOCUMENTS

| | | |
|---|---|---|
| 57-136074 | 8/1982 | Japan . |
| 59-38567 | 3/1984 | Japan . |
| 2-15789 | 4/1990 | Japan . |
| 8300819 | 10/1984 | Netherlands . |
| 8204142 | 11/1982 | WIPO . |

*Primary Examiner*—William E. Wayner
*Attorney, Agent, or Firm*—Cushman, Darby & Cushman

[57] ABSTRACT

An adsorbent enclosed in a gas control tube communicating with a thermosensitive tube of an expansion valve via a capillary tube adsorbs a refrigerant gas enclosed in the hermetically sealed space from a thermosensitive tube to a gas control tube. When this is heated by an electric heater, there is discharge of the refrigerant gas that was adsorbed up to then so that passage of current to the electric heater stops and there is adsorption of the refrigerant gas at normal temperature to a saturation state. As a result, if the electric current to the electric heater is stopped so that the adsorbent adsorbs the refrigerant gas, the pressure in the thermosensitive chamber (hermetically sealed space) drops and an expansion valve closes completely.

16 Claims, 7 Drawing Sheets

REFRIGERATING APPARATUS

This application is based upon and claims priority from Japanese Patent Application No. 6-32709 filed Mar. 3, 1994, the contents of which are incorporated herein by reference.

BACKGROUND OF THE INVENTION

1. Field of the invention

The present invention relates to refrigerating apparatus, more particularly is suitable for use in refrigerating apparatus having a plurality of evaporators in a single refrigeration cycle.

2. Description of the Related Art

There are already refrigerating apparatus containing a plurality of evaporators in a single refrigeration cycle. In such refrigerating apparatus, there is actually no need to constantly supply refrigerant to all evaporators. Instead, it is sufficient to supply the refrigerant to only the necessary evaporators. As a result, generally speaking, the equipment is constructed by installing a solenoid valve in each of the refrigerant tubes leading refrigerant to the evaporators. However, by employing such solenoid valves, the number of parts increases and the number of connection points also increases, thus leading to increased costs.

A technology was proposed that without using solenoid valves refrigerant is stopped being supplied to by forcedly closing expansion valves located upstream of the evaporators. As methods, in Japanese patent application laid-open 57-136074, for example, a technology is disclosed that a cooling element cools a capillary tube communicating to a thermosensitive tube of the expansion valve and the expansion valve is closed to decrease pressure in the thermosensitive tube. Also, in Japanese patent application laid-open 59-38567, a technology is disclosed that a part of a capillary tube communicating with a thermosensitive tube is connected thermally to low-pressure side refrigerant pipe in which low-temperature refrigerant flows at the downstream of the expansion tube, and thermosensitive gas enclosed in a thermosensitive tube is cooled to close the expansion valve and normally the capillary tube is heated by an electric heater.

However, the technology disclosed in Japanese patent application laid-open 57-136074 requires a special cooling element to cool the capillary tube as well as unnecessary electric power to pass a current through that cooling element, thus production cost becomes higher. As for the technology disclosed in Japanese patent application laid-open 59-38567, there is no flow of refrigerant to the low-temperature side refrigerant pipe if the expansion valve is completely closed, which means the capillary tube cannot be cooled. Thus, in order to bring a certain amount of refrigerant to the low-temperature side refrigerant pipe it is not possible to completely close the expansion valve, and since the amount of refrigerant flowing to the low-temperature side refrigerant pipe is small, it is easy to gather compressor oil in the evaporators.

Also, as mentioned above, with the temperature sensitive expansion valve which adjusts the valve aperture by converting the refrigerant pressure of the refrigerant temperature at the exit of the evaporators with the thermosensitive tube. If the high pressure of the refrigeration cycle decreases, the temperature of the expansion valve drops so that the temperature of the expansion valve becomes lower than that of the thermosensitive tube (It is generally known as the "cooling phenomenon"). In such a case, the thermosensitive gas enclosed in the communication space between the thermosensitive tube and the thermosensitive chamber is condensed due to the decline in temperature in the thermosensitive chamber, regardless of the refrigerant temperature at the exit of the evaporators. As a result, the pressure in the thermosensitive chamber (i.e., thermosensitive tube) drops, normal operation is not performed and the valve aperture becomes smaller.

SUMMARY OF THE INVENTION

The first purpose is to provide a refrigerating apparatus to completely close the expansion valve by means of external electrical control without using special cooling elements. The second purpose is to provide a refrigerating apparatus to prevent faulty operation due to a drop in the temperature of the expansion valve.

To achieve the purposes described above in one preferred mode, the invention adopts the techniques using a refrigerating apparatus including a plurality of evaporators for evaporating refrigerant, a plurality of expansion valves each having a thermosensitive tube which detects as pressure variation temperature variation of a refrigerant issuing from an evaporator due to thermosensitive gas enclosed therein, a throttle section to close a refrigerant path upstream of the evaporator, a valve element to vary an aperture of the throttle section, an energizing means to energize the valve element in a direction to decrease the aperture of the throttle section, a main valve possessing a thermosensitive chamber to which pressure of the thermosensitive tube is transmitted, and wherein the aperture of the throttle section is so adjusted that the valve element displaces to a position where the pressure of the thermosensitive chamber agrees with combined pressure of low-pressure side pressure downstream of the throttle section and energizing pressure of the energizing means, a gas control means having a gas control tube which communicates with the thermosensitive tube or the thermosensitive chamber to create a hermetically sealed space with the thermosensitive tube and the thermosensitive chamber, and in which the sealed space is enclosed an adsorbent to adsorb the thermosensitive gas, so that an adsorbancy-amount of the adsorbent declines as temperature becomes higher, a heating means provided in thermal contact with the gas control tube for heating the gas control tube by flowing an electric current, an electric current control means for controlling the current of the heating means.

Preferably the refrigerating apparatus is that the gas control means is located adjoining the sections composing the thermosensitive chamber of the valve element.

Preferably the refrigerating apparatus includes heat insulation means for insulating heat from the outside by surrounding the gas control means and a section forming the thermosensitive chamber of the main valve.

Preferably the refrigerating apparatus includes a plurality of switching means for independently opening and closing a plurality of refrigerant passages leading refrigerant to a plurality of evaporators connected in parallel with a single refrigerant compressor or each evaporator, and the switching means is composed of an expansion valve, a gas control means and an electric current control means.

In the refrigerating apparatus of the invention, the heating means heats the gas control tube and the temperature of the adsorbent rises, so that the adsorbent volume of the adsorbent falls and the thermosensitive gas adsorbed up to then in the adsorbent is discharged to a hermetically sealed space. As a result, the thermosensitive tube is possible to detect a pressure change of the refrigerant issues from the evaporators as the temperature change. The pressure in the thermosensitive tube is transmitted to the thermosensitive chamber and the valve aperture is adjusted.

Meanwhile, when the temperature of the adsorbent falls with stoppage of current of the heating means, the thermosensitive gas discharged in the hermetically sealed space is adsorbed by the adsorbent so that the pressure in the thermosensitive tube and thermosensitive chamber decreases.

As a result, when the thermosensitive gas is adsorbed by the adsorbent until the pressure of the thermosensitive chamber becomes smaller than the combined pressure of the low-pressure side pressure downstream of the throttle section and the energizing pressure of the energizing means, the main valve closes the throttle section, thus blocking the refrigerant passage.

Also, since the gas control means is located adjacently to the section forming the thermosensitive chamber of the main valve, during heating with the heating means, heat is transmitted from the heating means or the gas control tube to the section forming the thermosensitive chamber of the main valve. As a result, a decrease in temperature in the thermosensitive chamber which is caused from a decrease in the temperature of the main valve is prevented.

As a result of covering with an insulation means the area around the section forming the gas control means and the thermosensitive chamber of the main valve, heat is efficiently transferred from the heating means during generating the heat or the gas control tube to the section forming the thermosensitive chamber of the main valve.

Since there are a plurality of evaporators, a function of the expansion valve is achieved by passing a current through the heating means to evaporators to be used (evaporators to be required a refrigeration effect). Also, with regard to the evaporators not to be used, it is possible to completely close the expansion valve to shut off flow of the refrigerant without passing a current through the heating means.

DETAILED DESCRIPTION OF THE PRESENTLY PREFERRED EXEMPLARY EMBODIMENT

Figure 1:
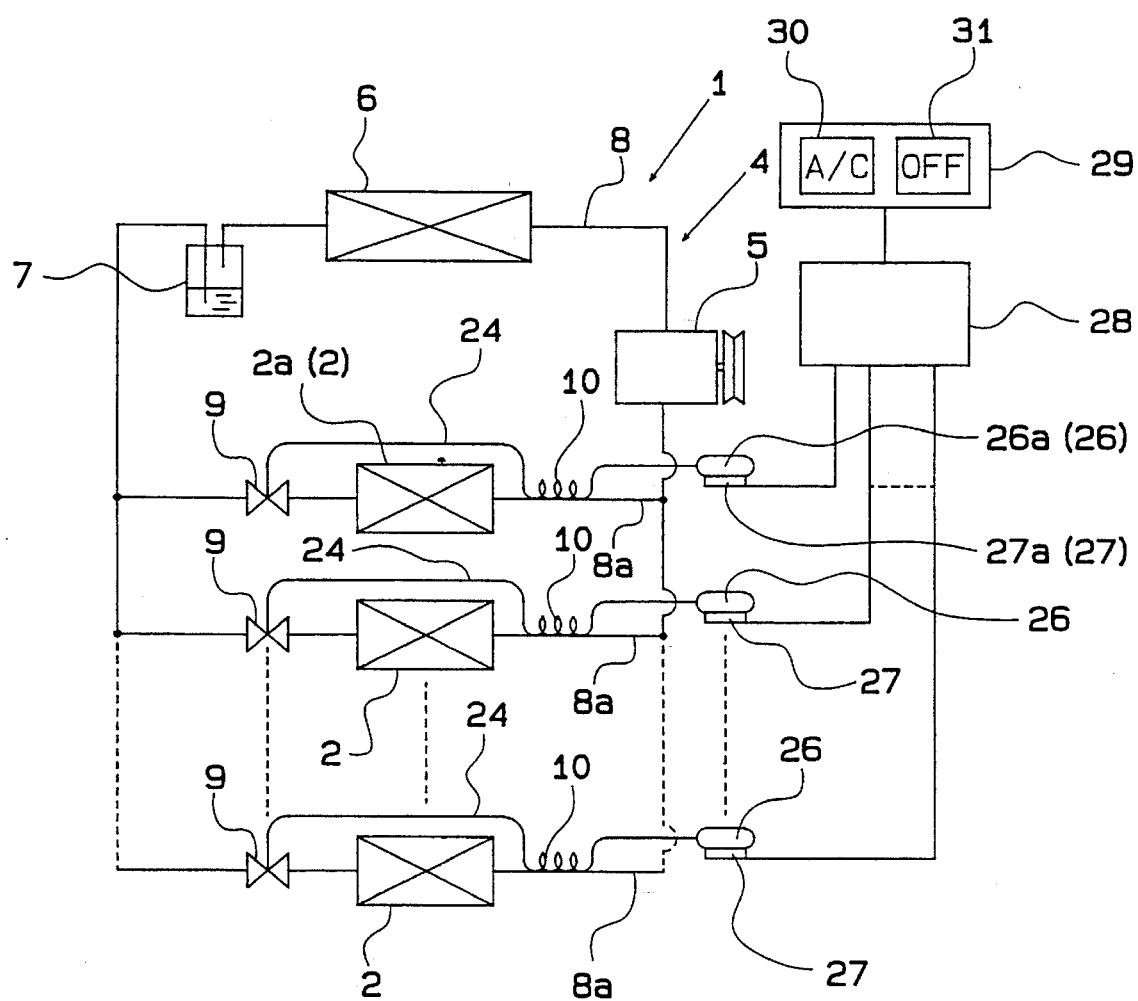
FIG. 1 is an entire schematic view of the refrigerating apparatus in the first embodiment.
Figure 2:
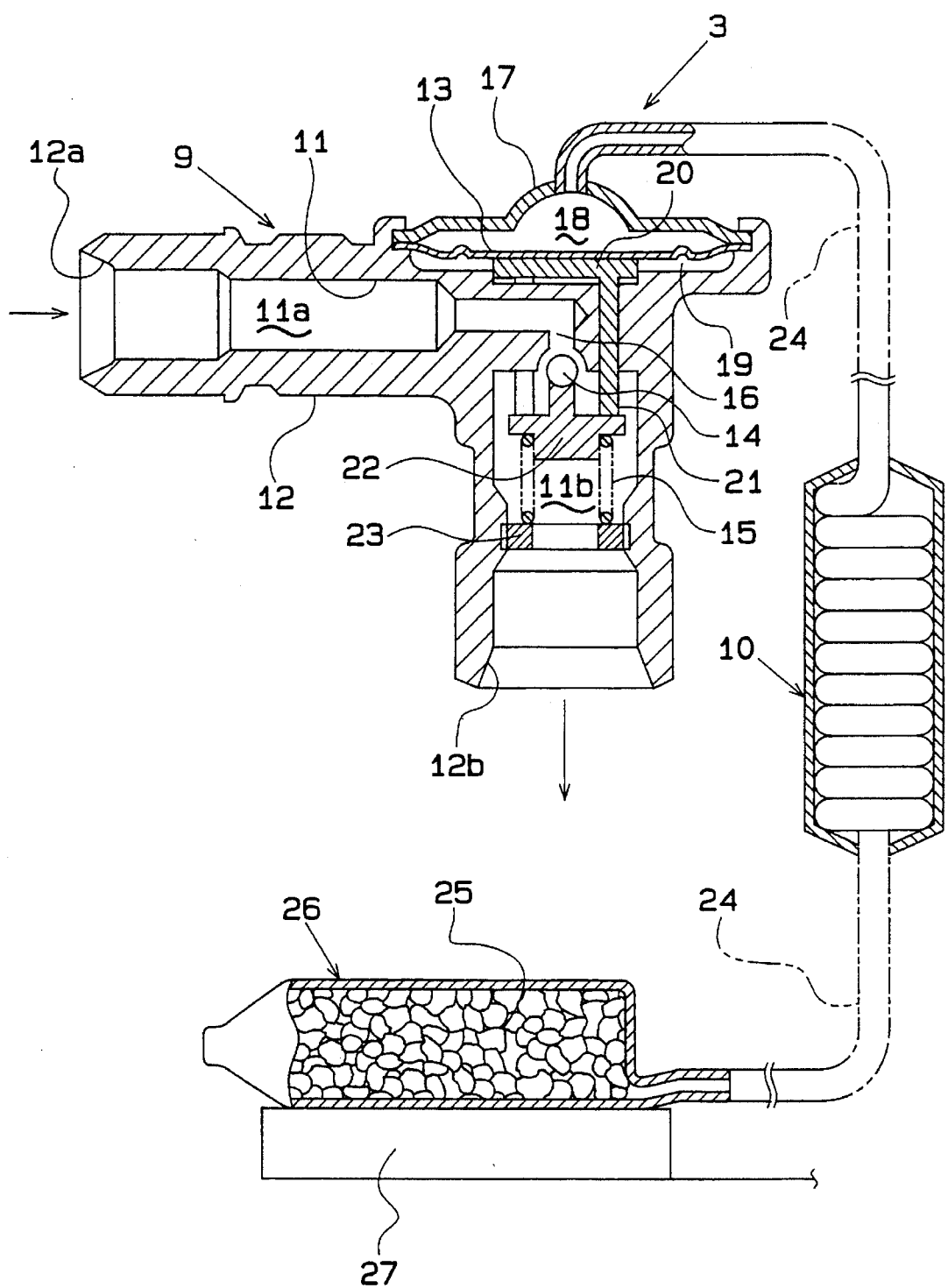
FIG. 2 is a cross-sectional view of the expansion valve and gas control means (the first embodiment)
Figure 3:
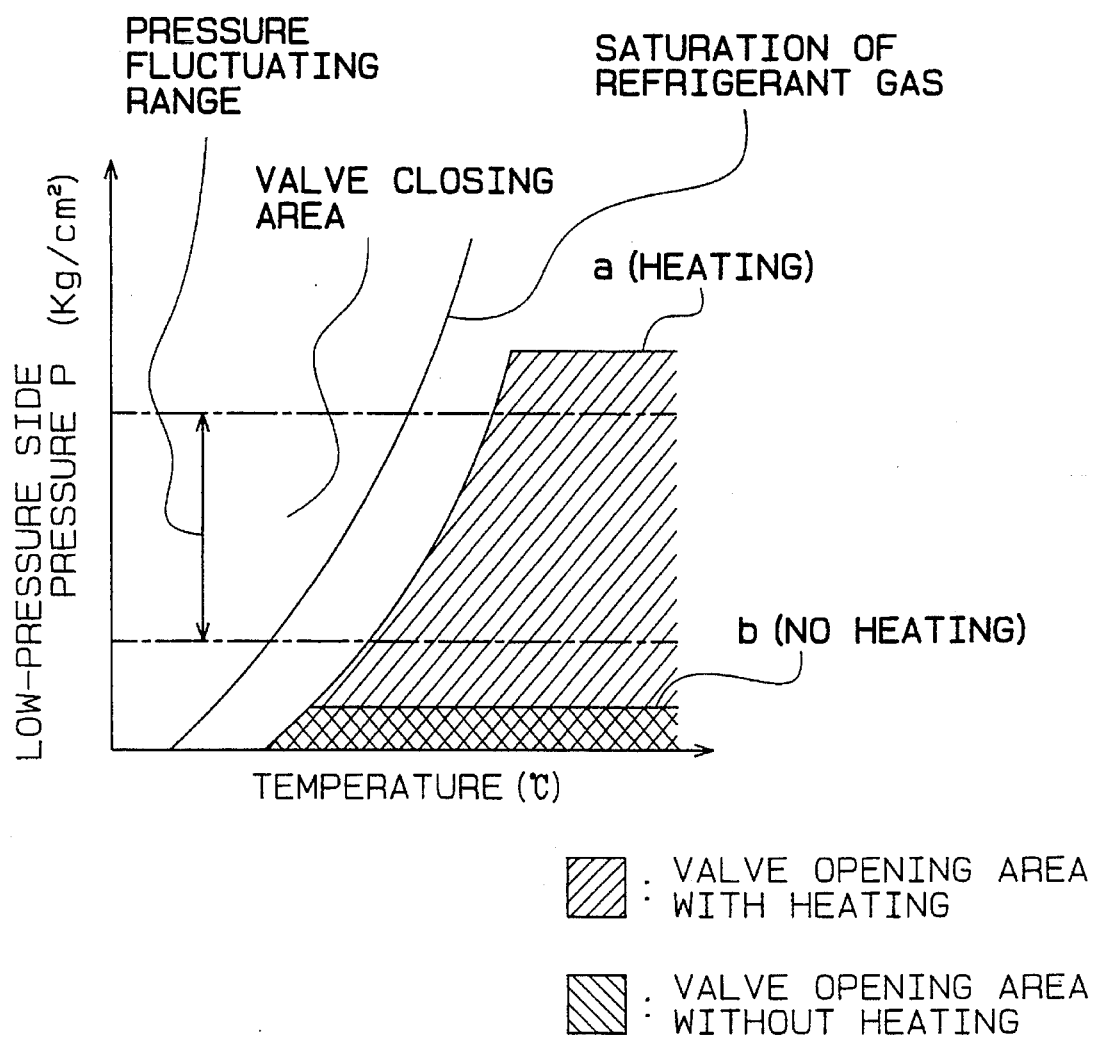
FIG. 3 is a graph illustrating the valve opening characteristics of the expansion valve (the first embodiment)

Next follows a description of an embodiment of the refrigerating apparatus in the invention based on FIG. 1 to FIG. 3. FIG. 1 is an entire schematic view of the refrigerating apparatus and FIG. 2 is a cross-sectional view of the expansion valve and gas control means. The refrigerating apparatus 1 in the embodiment is composed of a refrigeration cycle 4 including a plurality of evaporators 2 connected in parallel array, and a plurality of expansion valves 3 (see FIG. 2) to carry out pressure reduction expansion of the refrigerant supplied to the evaporators, an expansion valve control means (to be described later) that can vary the valve opening characteristics of expansion valves 3.

As is shown in FIG. 1, refrigeration cycle 4 includes (in addition to expansion valves 3 and evaporators 2) refrigerant compressor 5, a refrigerant condenser 6 and a receiver 7 which are all connected by refrigerant pipe 8. The expansion valve 3 is equipped with a main valve 9 installed upstream of the evaporators 2, and a thermosensitive tube 10 secured to an exit pipe 8a of evaporators 2.

As is shown in FIG. 2, main valve 9 is composed of a valve housing 12 which creates a refrigerant passage 11, a diaphragm 13 which changes position in accordance with changes in pressure in thermosensitive tube 10, a valve element 14 which operates in linked motion with changes in the position of diaphragm 13, and a spring 15 which energizes valve element 14.

Valve housing 12 has an intake port 12a into which the refrigerant led from receiver 7 flows, an outflow port 12b out of which the pressure reduced refrigerant flows, and a throttle section 16 which is located on refrigerant passage 11 extending from intake port 12a to outflow port 12b. The refrigerant passage 11 is formed in such a way that high-pressure side passage 11a from the upstream end (intake port 12a) to throttle section 16 and low-pressure side passage 11b from throttle section 16 to the downstream side (outflow port 12b) form a substantially right angle.

The diaphragm 13, which is made of thin stainless-steel plate, is sandwiched between valve housing 12 and cover 17 on the top of valve housing 12. A thermosensitive chamber is is formed between diaphragm 13 and cover 17 to which the pressure of thermosensitive tube 10 is transferred, and furthermore a pressure equalizing chamber 19 communicating with low-pressure side passage 11b is formed between diaphragm 13 and valve housing 12. The cover 17 is secured by caulking to valve housing 12.

The valve element 14 is disposed downstream of throttle section 16. The displacement of diaphragm 13 is transmitted to valve element 14 through a stopper 20 tightly fit to the bottom of diaphragm 13 (side of pressure equalizing chamber 19), three operating shafts 21 forming a unit with stopper 20, and valve holding materials 22 connected to operating shafts 21.

When the pressure in thermosensitive chamber 18 rises so that the displacement amount (displacement on lower side of FIG. 2) reaches a set value, stopper 20 comes in contact with valve housing 12 and controls the displacement amount so that the diaphragm does not displace any further.

The operating shafts 21 are disposed to pass through a through hole (not shown in figure) formed in valve housing 12 while retaining a small amount of space. The through hole is formed to communicate with pressure equalizing chamber 19 and low-pressure side passage 11b. As a result, the low-pressure side pressure (i.e., the evaporation pressure of evaporators 2) acts on pressure equalizing chamber 19 by passing through the space between the through hole and operating shafts 21. The valve holding materials 22 are located inside low-pressure side passage 11b and are formed integrally with valve element 14.

One end of spring 15 is anchored to the valve holding materials 22 and the other end is anchored to the adjustment screw 23 which is screwed into low-pressure side passage 11b. The spring 15 energizes valve element 14 in a direction (upper direction of FIG. 2) in which the aperture of throttle section 16 decreases. As a result, the pressure of the thermosensitive chamber 18 (pressure of thermosensitive tube 10) acts on valve element 14 in a direction that the aperture of throttle section 16 increases. The energizing force of spring 15 and the low-pressure side pressure act in a direction to decrease the aperture of throttle section 16. As a result, valve element 14 displaces to a position where the pressure of thermosensitive chamber 18 balances with the energizing force of spring 15 and the low-pressure side pressure.

The adjustment screw 23is used to adjust the attachment load of spring 15 responding to the attachment position in relation to valve housing 12.

The thermosensitive tube 10 has a capillary tube 24 which is wound up therein in a spiral fashion. The thermosensitive tube 10 communicates with thermosensitive chamber 18 via capillary tube 24.

The expansion valve control means include a gas control means composed of a gas control tube 26 into which an adsorbent 25 (activated charcoal, silica gel, etc.) is inserted, and an electric heater 27 which is used as the heating means to heat gas control tube 26, and a current control apparatus 28 to control the electric current of electric heater 27.

The gas control tube 26, a roughly cylindrical shaped container whose ends are hermetically sealed, is connected to capillary tube 24 extending from thermosensitive tube 10. It communicates with thermosensitive chamber 18 of main valve 9 via capillary tube 24. After creating a vacuum in the hermetically sealed space from thermosensitive chamber 18 to gas control tube 26 via capillary tube 24, there is insertion of the refrigerant gas (example of thermosensitive gas used with the invention).

The adsorbent 25 inserted in gas control tube 26 varies adsorbent volume according to temperature. At ordinary (normal) temperature it adsorbs the refrigerant gas inserted in the hermetically sealed space to a saturated state or close to a saturated state. When the temperature of adsorbent 25 rises, the adsorbent 25 discharges the refrigerant gas that was adsorbed up to then.

The electric heater 27 is disposed to connect thermally with gas control tube 26. Passing a current through it causes it to emit heat and heat gas control tube 26.

The current control apparatus 28 controls the electric current to electric heater 27 based on operational signals output from a control panel 29 (See FIG. 1). More specifically, by turning ON an air conditioner switch 30 to start refrigeration cycle 4, a current is passed through electric heater 27. And when an OFF switch 31 is turned off to stop function of refrigeration cycle 4, the electric current to electric heater 27 is cut.

The air conditioning switch 30 and the OFF switch 31 are set to each of evaporators 2. As a result, if one of air conditioning switches 30 is turned on, only electric heater 27 corresponding to air conditioning switch 30 is energized.

As shown in FIG. 3, expansion valve 3 composed of the above structure has different valve-opening characteristics depending on whether gas control tube 26 is heated or not. In other words, if gas control tube 26 is heated with electric heater 27 so that the temperature of adsorbent 25 rises, the refrigerant gas that was adsorbed up to then in adsorbent 25 is discharged. The valve-opening characteristics is shown as the solid line "a" in relation to the temperature variation of thermosensitive tube 10 (temperature variation of refrigerant flowing through exit pipe 8a of evaporators 2). The valve closing area in FIG. 3 is the area excluding diagonal lines. The solid line "a" shows a specific characteristic similar to that of the saturation of refrigerant gas around the pressure fluctuating range. When the temperature raises to a certain temperature, the pressure fluctuating range of the low-pressure side is covered by the valve-opening area with heating. Therefore, the valve element opens and it works as a normal temperature sensitive operational expansion valve 3.

Moreover, if the electric current is stopped to electric heater 27, gas control tube 26 is not heated. The refrigerant gas in the hermetically sealed space is adsorbed by adsorbent 25. The valve-opening characteristics is shown as the solid line "b" in relation to the temperature variation of thermosensitive tube 10. Thus, the valve is constantly closed within the pressure fluctuating range of the low-pressure side. As a result, if there is no electric current to electric heater 27 the expansion valve is completely closed and refrigerant tube 8 is closed, thus shutting off flow of the refrigerant.

Next follows a description of the operation of the embodiment.

It is assumed that a refrigeration effect is desired in an evaporator 2a among evaporators 2. In other words, when only using evaporator 2a, it is sufficient to supply refrigerant to evaporator 2a to be use, which means it is necessary to stop supply of refrigerant to the other evaporators 2. Regarding the other evaporators 2 where a refrigeration effect is not required (i.e., which do not require use), by not turning ON air conditioning switch 30 and not passing a current through electric heater 27, there is adsorption of refrigerant gas in adsorbent 25 in gas control tube 26 to close expansion valve 3, As a result, flow of refrigerant is stopped in expansion valve 3 so that there is no flow of refrigerant to the other evaporators 2.

Regarding evaporator 2a to be used, air conditioning switch 30 (This responds to a switching means) is turned on and a current is passed to electric heater 27 to heat gas control tube 26a. As a result, the refrigerant gas adsorbed up to then in adsorbent 25 is discharged, and then expansion valve 3 opens (valve opening characteristics shown by solid line "a" in FIG. 3). The low-temperature low-pressure refrigerant of which pressure is reduced in expansion valve 3 is supplied to evaporator 2a. That makes it possible to obtain a refrigeration effect in evaporator 2a.

In this way, together with control of electric current to electric heater 27, expansion valve 3 in the embodiment has both a refrigerant control function of a temperature sensitive operation expansion valve 3 and a switching valve function to open and close refrigerant pipe 8.

Next follows a description of a second embodiment of the invention.

Figure 4:
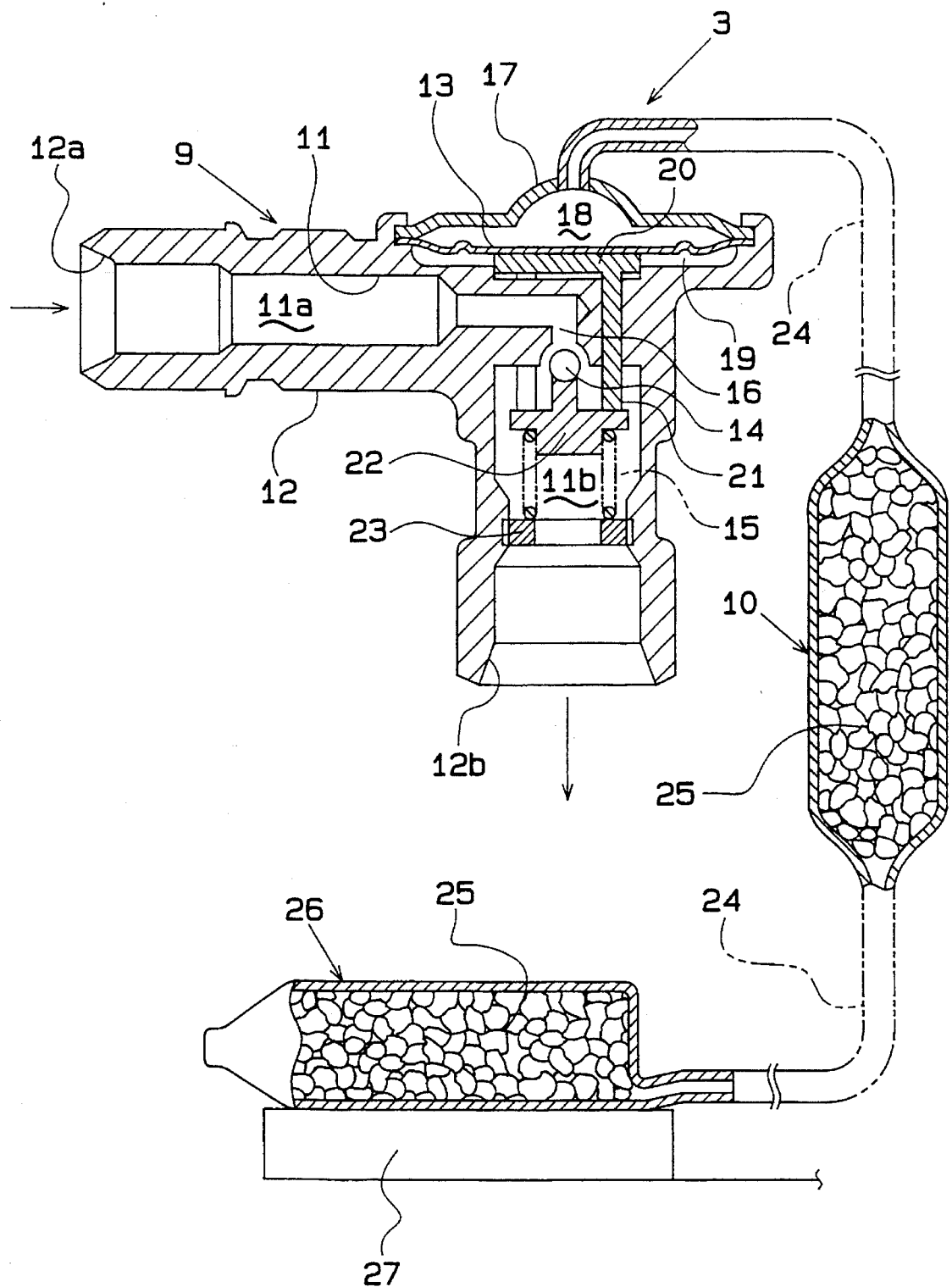
FIG. 4 is a cross-sectional view of the expansion valve and gas control means in the second embodiment.

FIG. 4 is a cross-sectional view of expansion valve 3 and gas control means involved in the second embodiment. In refrigerating apparatus 1, adsorbent 25 is enclosed in not only gas control tube 26 but also thermosensitive tube 10 of expansion valve 3. Adsorbent 25 of thermosensitive tube 10 varies its adsorbent volume in accordance with temperature variation in the refrigerant flowing through exit pipe 8a of the evaporators 2.

Figure 5:
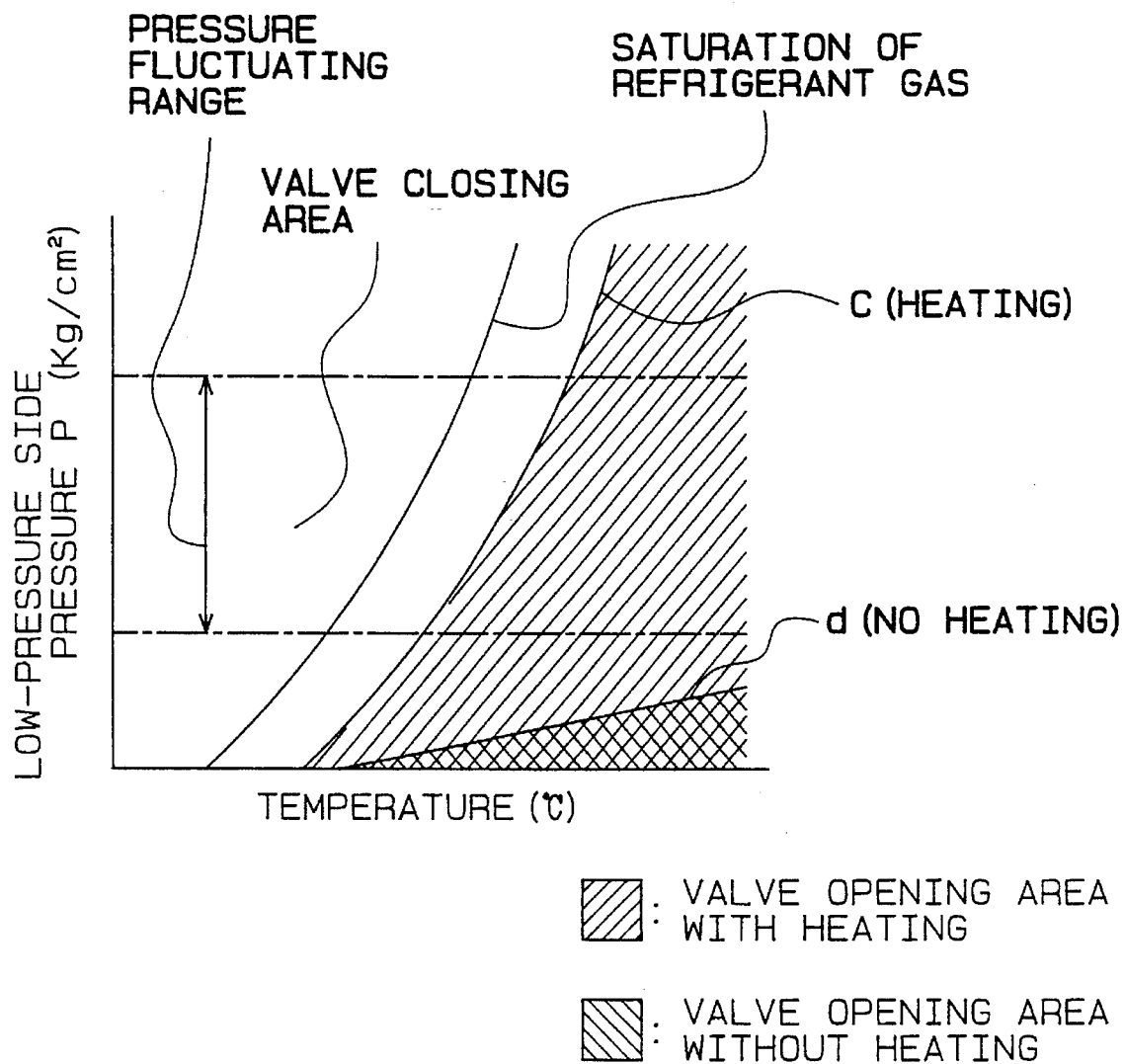
FIG. 5 is a graph showing the valve opening characteristics of the expansion valve (the second embodiment)

Adsorbent 25 in gas control tube 26 is heated with electric heater 27 to supply the appropriate amount of refrigerant gas to refrigerant thermosensitive tube 10. As a result, expansion valve 3 has valve opening characteristics shown as the solid line "c" in FIG. 5 so that it can perform the normal function of a temperature operation expansion valve 3. Moreover, by stopping the electric current to electric heater 27 and thus stopping heating of gas control tube 26, expansion valve 3 assumes the valve opening characteristics shown as the solid line "d" in FIG. 5, and the valve is constantly closed within the pressure fluctuating range of the low-pressure side.

As a result, even with refrigerating apparatus 1 in the embodiment, it is possible to obtain the same effect as that in the first embodiment by controlling the electric current to electric heater 27.

Next follows a description of the third embodiment of the invention.

Figure 6:
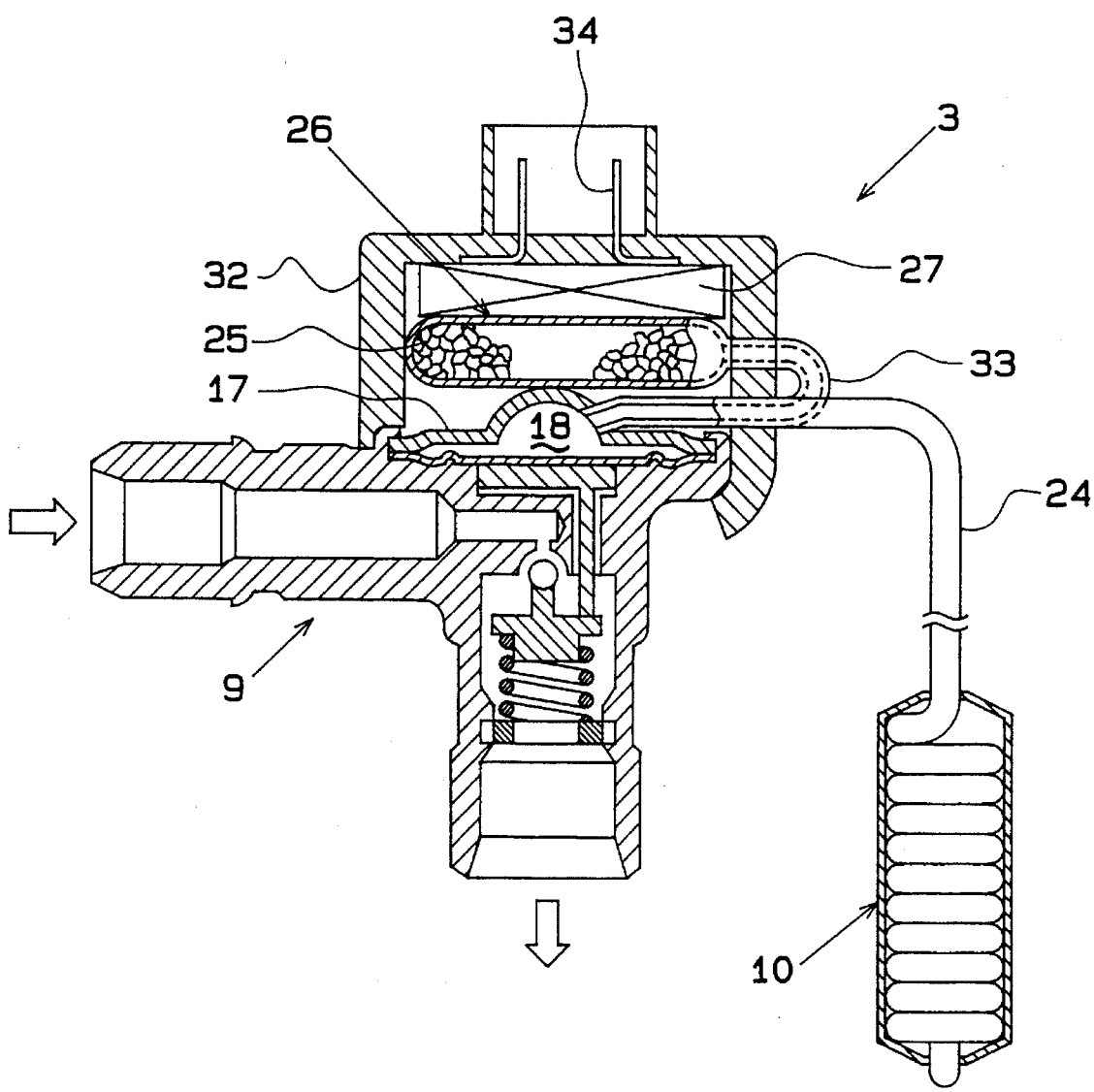
FIG. 6 is a cross-sectional view of the expansion valve and gas control means in the third embodiment.

FIG. 6 is a cross-sectional view of the expansion valve and gas control means.

Regarding refrigerating apparatus 1 in the embodiment, if the high-pressure side pressure drops so that the temperature of main valve 9 falls, heat radiated by electric heater 27 is used to prevent a decline in temperature in thermosensitive chamber 18. The gas control means is located on the top of main valve 9 and is covered by a plastic insulation cover 32 (concrete example of insulation means with the invention).

Gas control tube 26 is located on the top of cover 17 and adjoining thermosensitive chamber 18 of main valve 9 (section forming thermosensitive chamber 18 of the invention). It communicates directly with thermosensitive chamber 18 by means of capillary tube 33 without passing through thermosensitive tube 10. Also, gas control tube 26 has been designed as a thin disc-shaped structure in order to increase the contact surface area with electric heater 27 and improve the heat response characteristics of adsorbent 25. Electric heater 27 is located in contact with the upper wall surface of gas control tube 26.

Insulation cover 32 covers the gas control means in order to efficiently transfer the heat of electric heater 27 to cover 17. It is affixed to main valve 9 on the outer circumference of cover 17. An electrode 34 to pass an electric current to electric heater 27 is disposed at insulation cover 32.

As this shows, in the embodiment the gas control means is located on the top of thermosensitive chamber 18 (upper part of the cover 17) and the circumference is also surrounded by insulation cover 32 so that the heat of electric heater 27 is efficiently transferred to cover 17. As a result, the surrounding area of thermosensitive chamber 18 is heated, thus making it possible to prevent the temperature of thermosensitive chamber 18 from decreasing below the temperature of thermosensitive tube 10. As a result, the refrigerant gas enclosed in thermosensitive tube 10 (hermetically sealed space) is not condensed due to a temperature drop in thermosensitive chamber 18, and it is possible to perform normal valve operations corresponding to the pressure variations in thermosensitive tube 10.

Next follows a description of the fourth embodiment of the invention.

Figure 7:
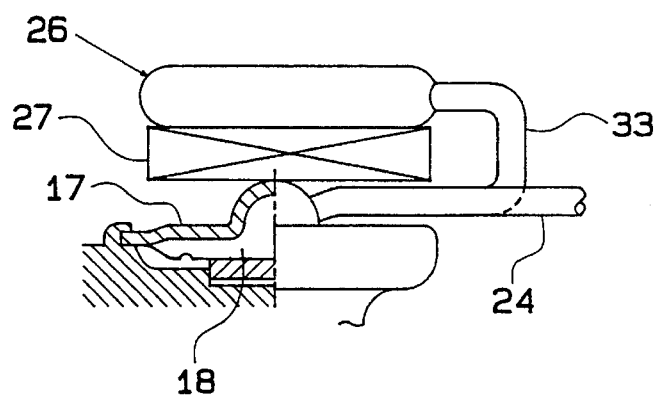
FIG. 7 is an arrangement view of the gas control means for the thermosensitive chamber (the fourth embodiment)

FIG. 7 is an arrangement view of the gas control means for thermosensitive chamber 18.

In the embodiment, the positions of gas control tube 26 and electric heater 27 as described in the third embodiment have been reversed. In other words, electric heater 27 is located on the top of cover 17 and the gas control tube 26 is located on top of electric heater 27. In this case, because it is possible to directly heat cover 17 with electric heater 27, this increases the cooling prevention effect for main valve 9.

Figure 8:
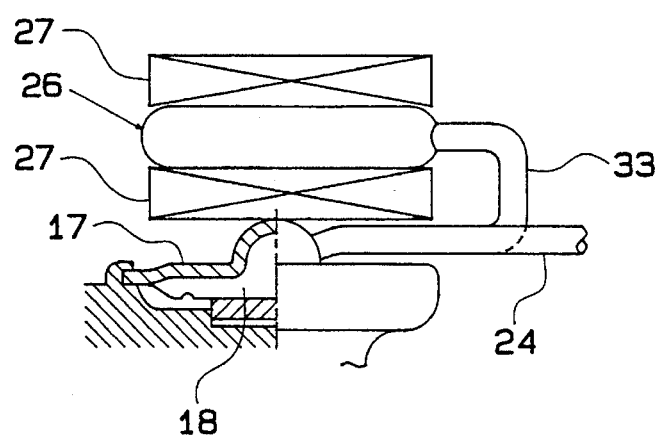
FIG. 8 is an arrangement view of the gas control means of the thermosensitive chamber (the fifth embodiment)

Next follows a description of the fifth embodiment of the invention. FIG. 8 is an arrangement view of the gas control means for thermosensitive chamber 18.

In the embodiment, two electric heaters 27 are placed on the upper and lower sides of gas control tube 26 so that gas control tube 26 is sandwiched between the electric heaters 27. In such a case, it is possible to increase the effectiveness of preventing from cooling main valve 9 as described in the third embodiment and, because gas control tube 26 is heated by electric heaters 27 from the top and bottom, it is possible to speed up the heat response of adsorbent 25. In this embodiment, it is also possible to use three or more electric heaters 27 and locate them so that they surround the gas control tube 26.

Next follows a description of the sixth embodiment of the invention.

Figure 9:
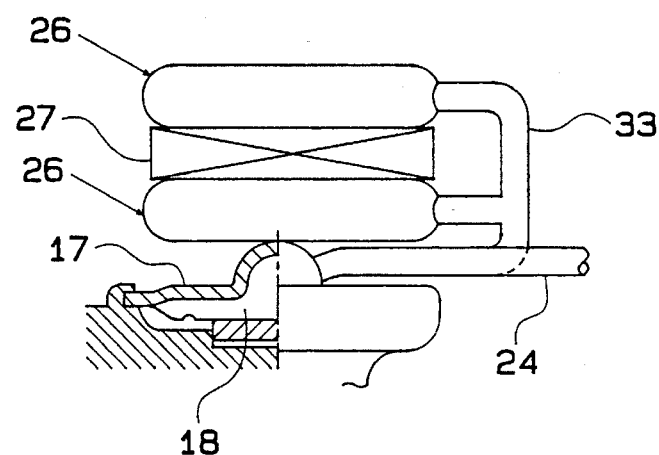
FIG. 9 is an arrangement view of the gas control means of the thermosensitive chamber (the sixth embodiment)

FIG. 9 is an arrangement view of the gas control means for thermosensitive chamber 18. In this embodiment, gas control tube 26 is divided into two tubes which both have a thinner design (i.e., thinner than those in embodiment 3). The gas control tubes 26 are located on the top and bottom sides of electric heater 27 so that electric heater 27 is sandwiched between the gas control tubes 26. In this case, because the gas control tubes 26 are formed thinner, it is possible to increase the heat response of adsorbent 25. In addition, in this embodiment it is possible to divide the gas control tubes into three or more tubes and locate them so that they surround the circumference of electric heater 27. It is also possible to use the system by combining the a plurality of electric heaters as described in embodiment 5 and a plurality of gas control tubes 26.

[Modified Example]

The embodiments above show an internal pressure equalizing type of expansion valve 3. However, it is also possible to create an embodiment in the same way with an external pressure equalizing type expansion valve.

[Effect of the Invention]

The refrigerating apparatus in this invention makes it possible to achieve a valve closing function for the expansion valve by external electrical control without expensive cooling elements. For this reason, compared to conventional apparatus using cooling elements, it is possible to reduce costs. Also, in the case of conventional apparatus using cooling elements, because this involves a method of passing an electric current to cooling elements even for evaporators that do not require a refrigeration effect, the required consumed electric power becomes high under normal usage conditions. In contrast to this, this invention involves applying electric current to a heating means only for the evaporators where a refrigeration effect is desired and not passing an electric current to heating means for evaporators that do not require a refrigeration effect. As a result, compared to the existing apparatus described above, it is possible to keep consumed electric power low.

Also, by locating the gas control means in a location adjoining the section forming the thermosensitive chamber, even in cases where the temperature of the main valve drops because of the cooling phenomenon, it is possible to use heat emission of the heating means to prevent the temperature of the refrigerant thermosensitive chamber from falling. For this reason, it is possible to perform normal operation of the expansion valve.

What is claimed is:

1. A refrigerating apparatus comprising:

a plurality of evaporators for evaporating refrigerant;

a plurality of expansion valves each having a thermosensitive tube which generates a pressure variation in response to temperature variation of a refrigerant issuing from an evaporator due to thermosensitive gas enclosed within the tube, a throttle section to close a refrigerant path upstream of said evaporator, a valve element to vary an aperture of said throttle section, an energizing means to energizing means to energize said valve element in a direction to decrease the aperture of the throttle section, a main valve having a thermosensitive chamber to which pressure of said thermosensitive tube is transmitted, and wherein said aperture of said throttle section is so adjusted that said valve element displaces to a position where the pressure of the thermosensitive chamber is equal to the combined pressure of a low-pressure chamber and the energizing pressure of the energizing means, a diaphragm separating the chambers;

gas control means having a gas control tube which communicates with said thermosensitive tube of said thermosensitive chamber to create a hermetically sealed space with said thermosensitive tube and said thermosensitive chamber, said sealed space enclosing an adsorbent to adsorb the thermosensitive gas, so that an adsorbancy amount of the adsorbent declines as temperature becomes higher, heating means provided in thermal contact with said gas control tube for heating said gas control tube by flowing an electric current; and electric current control means for controlling the current of said heating means.

2. The refrigerating apparatus according to claim 1, further comprising a switching means for operating said refrigerant apparatus and wherein said electric current control means supplies current to said heating means when said switching means is turned on.

3. The refrigerating apparatus according to claim 1, wherein said gas control means is provided to be adjacent to said section forming said thermosensitive chamber of said main valve.

4. The refrigerating apparatus according to claim 1, wherein said gas control means is provided to allow heat to transmit from said heating means or said gas control tube to a section composing said thermosensitive chamber of said main valve during said heating means generates heat.

5. The refrigerating apparatus according to claim 1, wherein said gas control means is provided to set said gas control tube between said section where said gas control tube composes said thermosensitive chamber of the main valve, and said heating means.

6. The refrigerating apparatus according to claim 1, wherein said gas control means is provided to set said heating means between said section where said gas control tube composes said thermosensitive chamber of the main valve, and said gas control tube.

7. The refrigerating apparatus according to claim 1, wherein said gas control means has a plurality of said heating means which are disposed around said gas control tube.

8. The refrigerating apparatus according to claim 1, wherein said gas control means has a plurality of said gas control tube which are disposed around said heating means.

9. The refrigerating apparatus according to claim 3, comprising heat insulation means for insulating heat from the outside by surrounding said gas control means and a section forming said thermosensitive chamber of said main valve.

10. The refrigerating apparatus according to claim 3, wherein said gas control means is provided to set said gas control tube between said section where said gas control tube composes said thermosensitive chamber of the main valve, and said heating means.

11. The refrigerating apparatus according to claim 3, wherein said gas control means is provided to set said heating means between said section where said gas control tube composes said thermosensitive chamber of the main valve, and said gas control tube.

12. The refrigerating apparatus according to claim 3, wherein said gas control means has a plurality of said heating means which are disposed around said gas control tube.

13. The refrigerating apparatus according to claim 3, wherein said gas control means has a plurality of said gas control tube which are disposed around said heating means.

14. The refrigerating apparatus according to claim 3, comprising heat insulation means for insulating heat from the outside by surrounding said gas control means and a section forming said thermosensitive chamber of said main valve.

15. A refrigerating apparatus comprising:

a plurality of evaporators for evaporating refrigerant;

a plurality of expansion valves each having a thermosenstive tube which generates a pressure variation in response to temperature variation of a refrigerant issuing from an evaporator due to thermosensitive gas enclosed within the tube, a throttle section to close a refrigerant path upstream of said evaporator, a valve element to vary an aperture of said throttle section, an energizing means to energize said valve element in a direction to decrease the aperture of the throttle section, a main valve having a thermosensitive chamber to which pressure of said thermosensitive tube is transmitted, and wherein said aperture of said throttle section is so adjusted that said valve element displaces to a position where the pressure of the thermosensitive chamber is equal to the combined pressure of a low-pressure chamber downstream of said throttle section and energizing pressure of the energizing means, a diaphragm separating the chambers;

gas control means having a gas control tube which communicates with said thermosensitive tube or said thermosensitive chamber to create a hermetically sealed space with said thermosensitive tube and said thermosensitive chamber, sealed space enclosing an adsorbent to adsorb the thermosensitive gas, so that an adsorbancy amount of the adsorbent declines as temperature becomes higher, heating means provided in thermal contact with said gas control tube for heating said gas control tube by flowing an electric current;

electric current control means for controlling the current of said heating means; and switching means for operating said refrigerant apparatus, wherein said electric current control means supplies current to said heating means.

16. The refrigerating apparatus according to claim 15, wherein each evaporator has said switching means respectively.

* * * * *

UNITED STATES PATENT AND TRADEMARK OFFICE
CERTIFICATE OF CORRECTION

PATENT NO. : 5,515,695
DATED : May 14, 1996
INVENTOR(S) : SAKAKIBARA et al

It is certified that error appears in the above-indentified patent and that said Letters Patent is hereby corrected as shown below:

On the title page, add the following:

[30]    Foreign Application Priority Data

Mar 3, 1994 [JP] Japan . . . . . .6-32709

Signed and Sealed this

Eighteenth Day of February, 1997

Attest:

BRUCE LEHMAN

*Attesting Officer*     *Commissioner of Patents and Trademarks*